(12) United States Patent
Wang et al.

(10) Patent No.: US 12,199,785 B2
(45) Date of Patent: Jan. 14, 2025

(54) MEETING ROBOT

(71) Applicant: Telefonaktiebolaget LM Ericsson (publ), Stockholm (SE)

(72) Inventors: Dan Wang, Saint-Laurent (CA); Ghassan Abdallah, Laval (CA); Baosheng Xu, Saint-Laurent (CA); Bin Liu, Kirkland (CA); Weizhen Nie, Saint-Laurent (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/246,915

(22) PCT Filed: Oct. 2, 2020

(86) PCT No.: PCT/IB2020/059286
§ 371 (c)(1),
(2) Date: Mar. 28, 2023

(87) PCT Pub. No.: WO2022/069927
PCT Pub. Date: Apr. 7, 2022

(65) Prior Publication Data
US 2023/0412414 A1     Dec. 21, 2023

(51) Int. Cl.
*H04L 12/18* (2006.01)
*G10L 15/26* (2006.01)

(52) U.S. Cl.
CPC .......... *H04L 12/1831* (2013.01); *G10L 15/26* (2013.01); *H04L 12/1818* (2013.01)

(58) Field of Classification Search
CPC ..... H04L 12/1818; H04L 65/403; H04N 7/15; H04M 3/56; H04M 2203/5054; H04M 15/8072; H04M 3/567
See application file for complete search history.

(56) References Cited

U.S. PATENT DOCUMENTS 8,825,362 B2 *  9/2014  Kirsch ................ H04M 1/6091
                                              705/7.18
10,334,110 B2 *  6/2019  Herrin ................ G06Q 10/1095
(Continued)

FOREIGN PATENT DOCUMENTS

JP     2004-264464 A     9/2004

OTHER PUBLICATIONS

International Search Report and Written Opinion dated Jun. 1, 2021 issued in PCT Application No. PCT/IB2020/059286 filed Oct. 2, 2020, consisting of 17 pages.
(Continued)

*Primary Examiner* — Chirag R Patel
(74) *Attorney, Agent, or Firm* — Weisberg I.P. Law, P.A.

(57) ABSTRACT

A meeting robot method and system is provided. In one embodiment, a meeting substitute system includes processing circuitry configured to cause the meeting substitute system to obtain information related to a meeting request, the information associated with a teleconference meeting and the information including a date and a time for the teleconference meeting; as a result of a trigger, automatically: join the teleconference meeting at the date and the time; and during the joined teleconference meeting, capturing a set of meeting data for the teleconference meeting, the captured set of meeting data comprising at least one of a video recording and an audio recording of the teleconference meeting and a speech-to-text translation; and generate a meeting summary based at least in part on the captured set of meeting data for the teleconference meeting.

21 Claims, 5 Drawing Sheets

(56) References Cited

U.S. PATENT DOCUMENTS

| | | | | |
|---|---|---|---|---|
| 11,488,634 B1* | 11/2022 | Decrop | ................ | G11B 27/031 |
| 2005/0267975 A1* | 12/2005 | Qureshi | .................. | H04L 51/04 |
| | | | | 709/229 |
| 2010/0205543 A1* | 8/2010 | Von Werther | ....... | H04L 12/1818 |
| | | | | 709/227 |
| 2013/0325972 A1* | 12/2013 | Boston | ................... | G06Q 10/10 |
| | | | | 709/204 |
| 2018/0077099 A1 | 3/2018 | Silva et al. | | |
| 2019/0028520 A1* | 1/2019 | Nawrocki | ............. | G06F 40/205 |
| 2019/0327362 A1 | 10/2019 | Herrin et al. | | |
| 2019/0384813 A1* | 12/2019 | Mahmoud | ............ | G06F 40/289 |
| 2020/0243095 A1* | 7/2020 | Adlersberg | ........... | G06F 40/216 |
| 2020/0252442 A1* | 8/2020 | Brown | ................ | H04L 12/1818 |
| 2020/0258525 A1 | 8/2020 | McQuiston et al. | | |

OTHER PUBLICATIONS

Zhiwen Yu et al., Smart Meeting Systems: A Survey of State-of-the-Art and Open Issues; ACM Computing Surveys, vol. 42, No. 2, Article 8; Feb. 2010, consisting of 20 pages.

Japanese Office Action and English translation of the Japanese Office Action dated Jun. 18, 2024 issued in Corresponding Japanese Patent Application No. 2023-520118, consisting of 11 pages.

* cited by examiner

MEETING ROBOT

CROSS-REFERENCE TO RELATED APPLICATION

This application is a Submission Under 35 U.S.C. § 371 for U.S. National Stage Patent Application of International Application Number: PCT/IB2020/059286, filed Oct. 2, 2020 entitled "MEETING ROBOT," the entirety of which is incorporated herein by reference.

TECHNICAL FIELD

The present disclosure relates to teleconference meetings and in particular, a meeting robot system and method.

BACKGROUND

Digital meetings, i.e., online meetings/teleconference meetings, such as video conferencing or other teleconference meetings are becoming an increasingly popular platform for conducting meetings, both personally and professionally. In addition, calendar platforms, such as, Microsoft Outlook, allow users to plan, organize and invite others to such teleconference meetings. For example, an email may be sent to others including an invitation to join a teleconference meeting, which the others may accept, decline or propose a different time/date.

However, there may be a meeting conflict. For example, a user may receive invitations for two different meetings having times that overlap, or may otherwise be unavailable for a particular meeting. The user may propose a different meeting time/date; however, the meeting invitation is typically sent to many users that may have already informally agreed on a date and time for the meeting. Thus, the user may desire to not request a change in the meeting time which may conflict with other users' calendared meetings.

If the user is unavailable and does not desire to request a change to the meeting time that may affect the availability of other invitees to attend the meeting, the user typically declines the invitation or possibly accepts, but is not able to attend meetings overlapping in time. Existing solutions do not provide an efficient solution for meeting scheduling in the face of meeting conflicts.

SUMMARY

Some embodiments advantageously provide a method and system for a meeting robot.

According to an aspect of the present disclosure, a computer-implemented method is provided. The method includes obtaining, by a meeting substitute system, information related to a meeting request, the information associated with a teleconference meeting and the information including a date and a time for the teleconference meeting. The method includes as a result of a trigger, automatically: joining, by the meeting substitute system, the teleconference meeting at the date and the time; and during the joined teleconference meeting, capturing, by the meeting substitute system, a set of meeting data for the teleconference meeting, the captured set of meeting data comprising at least one of a video recording and an audio recording of the teleconference meeting and a speech-to-text translation. The method includes generating, by the meeting substitute system, a meeting summary based at least in part on the captured set of meeting data for the teleconference meeting.

In some embodiments of this aspect, obtaining information related to the meeting request includes receiving, by the meeting substitute system, the meeting request from a first user device associated with a first user, the first user being an intended recipient of the meeting request. In some embodiments of this aspect, the trigger comprises the receiving of the meeting request from the first user device. In some embodiments of this aspect, the trigger comprises obtaining, by the meeting substitute system, an indication that at least one user invited to the teleconference meeting is unable to attend the teleconference meeting.

In some embodiments of this aspect, the trigger is initiated by a first user device associated with a first user account; and the automatically joining by the meeting substitute system comprises joining the teleconference meeting using a second virtual user account associated with the meeting substitute system. In some embodiments of this aspect, the automatically joining and capturing includes: automatically joining, by the meeting substitute system, the teleconference meeting at the date and the time and capturing the set of meeting data for the teleconference meeting independent of a first user device associated with a first user, the first user being an intended recipient of the meeting request and the first user providing the trigger.

In some embodiments of this aspect, the automatically joining and capturing includes: automatically joining, by the meeting substitute system, the teleconference meeting at the date and the time and capturing the set of meeting data for the teleconference meeting independent of any user device associated with any user that is an intended recipient of the meeting request. In some embodiments of this aspect, generating the meeting summary includes providing the speech-to-text translation of the teleconference meeting to at least one natural language processing model to generate a text-based meeting summary. In some embodiments, generating the meeting summary includes determining a domain associated with the teleconference meeting and selecting the at least one natural language processing model to use for the meeting summary based at least in part on the domain.

In some embodiments of this aspect, the at least one natural language processing model is configured to use the speech-to-text translation and the determined domain to output at least one of: at least one key discussion point of the teleconference meeting; at least one action item for the teleconference meeting; and at least one answer to at least one question asked during the teleconference meeting. In some embodiments of this aspect, generating the meeting summary further includes autonomously selecting a plurality of video segments from the video recording and generating a video meeting summary comprising the selected plurality of video segments.

In some embodiments of this aspect, selecting the plurality of video segments includes using the speech-to-text translation to identify at least one of: at least one key discussion point of the teleconference meeting; at least one action item for the teleconference meeting; and at least one answer to at least one question asked during the teleconference meeting; and selecting the plurality of video segments from the video recording corresponding to the at least one of the at least one key discussion point, the at least one action item and the at least one answer.

In some embodiments of this aspect, the meeting summary comprises at least one of: meeting minutes document based at least in part on the speech-to-text translation; and a video meeting summary based at least in part on the speech-to-text translation. In some embodiments of this aspect, the method further includes accepting, by the meeting substitute system, the meeting request using a virtual user account associated with the meeting substitute system, the virtual user account being different from a first user account associated with a first user device that received the meeting request for the teleconference meeting.

In some embodiments of this aspect, the method further includes monitoring an electronic calendar comprising a plurality of meeting events scheduled using a virtual user account associated with the meeting substitute system; and the automatically joining the teleconference meeting is based at least in part on the electronic calendar. In some embodiments of this aspect, the method further includes storing, in a relational database associated with the meeting substitute system, the plurality of meeting events, including the information related to the meeting request; determining whether there are duplicate entries in the relational database for a same teleconference meeting; and based on the determination, joining the same teleconference meeting once and providing a same set of meeting data to each user device associated with the duplicate entries.

In some embodiments of this aspect, the method further includes determining, by the meeting substitute system, that the teleconference meeting is over; and based on the determination, automatically stopping, by the meeting substitute system, the capturing of the set of meeting data for the teleconference meeting and initiating the generation of the meeting summary. In some embodiments of this aspect, the method further includes when the teleconference meeting is over, providing, to a first user device associated with a first user, access to at least a subset of the set of meeting data for the teleconference meeting and the generated meeting summary, the first user being an intended recipient of the meeting request. In some embodiments of this aspect, the providing includes sending, by the meeting substitute system, a meeting notification to the first user device associated with the intended recipient of the meeting request, the meeting notification being associated with the meeting request and the meeting notification providing access information.

According to another aspect of the present disclosure, a meeting substitute system includes processing circuitry. The processing circuitry is configured to cause the meeting substitute system to obtain information related to a meeting request, the information associated with a teleconference meeting and the information including a date and a time for the teleconference meeting; as a result of a trigger, automatically: join the teleconference meeting at the date and the time; and during the joined teleconference meeting, capturing a set of meeting data for the teleconference meeting, the captured set of meeting data comprising at least one of a video recording and an audio recording of the teleconference meeting and a speech-to-text translation; and generate a meeting summary based at least in part on the captured set of meeting data for the teleconference meeting.

In some embodiments of this aspect, the processing circuitry configured to cause the meeting substitute system to obtain the information related to the meeting request by being configured to cause the meeting substitute system to: receive the meeting request from a first user device associated with a first user, the first user being an intended recipient of the meeting request. In some embodiments of this aspect, the trigger includes the receiving of the meeting request from the first user device. In some embodiments of this aspect, the trigger includes obtaining, by the meeting substitute system, an indication that at least one user invited to the teleconference meeting is unable to attend the teleconference meeting. In some embodiments of this aspect, the trigger is initiated by a first user device associated with a first user account; and the processing circuitry is configured to cause the meeting substitute system to automatically join by being configured to join the teleconference meeting using a second virtual user account associated with the meeting substitute system.

In some embodiments of this aspect, the processing circuitry is configured to cause the meeting substitute system to automatically join and capture by being configured to cause the meeting substitute system to: automatically join the teleconference meeting at the date and the time and capture the set of meeting data for the teleconference meeting independent of a first user device associated with a first user, the first user being an intended recipient of the meeting request and the first user providing the trigger. In some embodiments of this aspect, the processing circuitry is configured to cause the meeting substitute system to automatically join and capture by being configured to cause the meeting substitute system to: automatically join the teleconference meeting at the date and the time and capture the set of meeting data for the teleconference meeting independent of any user device associated with any user that is an intended recipient of the meeting request.

In some embodiments of this aspect, the processing circuitry is configured to cause the meeting substitute system to generate the meeting summary by being configured to cause the meeting substitute system to provide the speech-to-text translation of the teleconference meeting to at least one natural language processing model to generate a text-based meeting summary. In some embodiments of this aspect, the processing circuitry is configured to cause the meeting substitute system to generate the meeting summary by being configured to cause the meeting substitute system to determine a domain associated with the teleconference meeting and select the at least one natural language processing model to use for the meeting summary based at least in part on the domain.

In some embodiments of this aspect, the at least one natural language processing model is configured to use the speech-to-text translation and the determined domain to output at least one of: at least one key discussion point of the teleconference meeting; at least one action item for the teleconference meeting; and at least one answer to at least one question asked during the teleconference meeting. In some embodiments of this aspect, the processing circuitry is configured to cause the meeting substitute system to generate the meeting summary by being configured to cause the meeting substitute system to autonomously select a plurality of video segments from the video recording and generating a video meeting summary comprising the selected plurality of video segments.

In some embodiments of this aspect, the processing circuitry is configured to cause the meeting substitute system to select the plurality of video segments by being configured to cause the meeting substitute system to: use the speech-to-text translation to identify at least one of: at least one key discussion point of the teleconference meeting; at least one action item for the teleconference meeting; and at least one answer to at least one question asked during the teleconference meeting; and select the plurality of video segments from the video recording corresponding to the at least one of the at least one key discussion point, the at least one action item and the at least one answer.

In some embodiments of this aspect, the meeting summary includes at least one of: meeting minutes document based at least in part on the speech-to-text translation; and a video meeting summary based at least in part on the speechto-text translation. In some embodiments of this aspect, the processing circuitry is further configured to cause the meeting substitute system to accept the meeting request using a virtual user account associated with the meeting substitute system, the virtual user account being different from a first user account associated with a first user device that received the meeting request for the teleconference meeting.

In some embodiments of this aspect, the processing circuitry is further configured to cause the meeting substitute system to: monitor an electronic calendar comprising a plurality of meeting events scheduled using a virtual user account associated with the meeting substitute system; and automatically join the teleconference meeting based at least in part on the electronic calendar. In some embodiments of this aspect, the processing circuitry is further configured to cause the meeting substitute system to: store, in a relational database associated with the meeting substitute system, the plurality of meeting events, including the information related to the meeting request; determine whether there are duplicate entries in the relational database for a same teleconference meeting; and based on the determination, join the same teleconference meeting once and provide a same set of meeting data to each user device associated with the duplicate entries.

In some embodiments of this aspect, the processing circuitry is further configured to cause the meeting substitute system to: determine that the teleconference meeting is over; and based on the determination, automatically stop the capturing of the set of meeting data for the teleconference meeting and initiate the generation of the meeting summary. In some embodiments of this aspect, the processing circuitry is further configured to cause the meeting substitute system to: when the teleconference meeting is over, provide, to a first user device associated with a first user, access to at least a subset of the set of meeting data for the teleconference meeting and the generated meeting summary, the first user being an intended recipient of the meeting request.

In some embodiments of this aspect, the processing circuitry is configured to cause the meeting substitute system to provide the access by being configured to cause the meeting substitute system to send a meeting notification to the first user device, the meeting notification being associated with the meeting request and the meeting notification providing access information.

According to yet another aspect of the present disclosure, a system includes computer instructions executable by processing circuitry to perform any of the methods disclosed herein.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
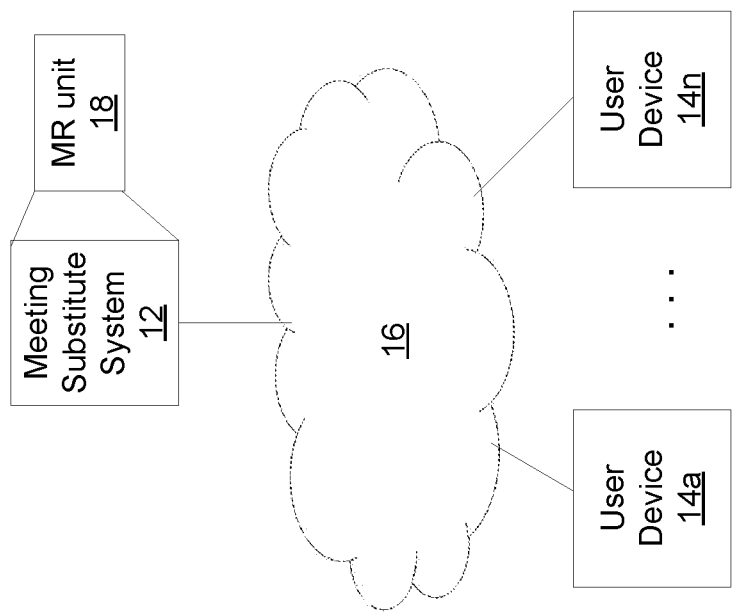
FIG. 1 illustrates an example system architecture according to some embodiments of the present disclosure.

Some embodiments of the present disclosure provide an arrangement that allows a person that has a conflicting meeting, and is therefore unable to attend, to forward a meeting request (e.g., a meeting invite email) to a meeting robot, also referred to herein as a meeting substitute system. The meeting robot will receive the meeting request, fetch the meeting information (e.g., meeting time/date and link) and login to and/or join the meeting when the date and time is reached. The meeting substitute system may then record the meeting, translate the voice-to-text (e.g., using a transcript function) and/or use the translation to generate a summary of the meeting (e.g., the meeting minutes). At the end of the teleconference meeting, the meeting robot may send (e.g., via email) the person a link to the recording of the meeting and the generated summary of the meeting (e.g., meeting minutes).

Some embodiments of the present disclosure may advantageously provide a meeting robot/meeting substitute system that may assist meeting invitees with solving the meeting conflict problem. Some embodiments may advantageously allow invitees to retrieve meeting information automatically, without, for example, having to ask another invitee to send the meeting minutes, or reminding another person to record the meeting for them.

Before describing in detail exemplary embodiments, it is noted that the embodiments reside primarily in combinations of apparatus components and processing steps related to a meeting robot system and method. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting term computing device is used herein and can be any type of computing device capable of implementing one or more of the techniques disclosed herein. For example, the computing device may be a personal computer (PC), user equipment (UE), wireless device (WD), Tablet, mobile terminals, smart phone, laptop, etc. associated with a user to, for example, send information related to a meeting request and/or receive a meeting summary.

A meeting substitute system may include physical components, such as processors, allocated processing elements, or other computing hardware, computer memory, communication interfaces, and other supporting computing hardware. The meeting substitute system may use dedicated physical components, or the meeting substitute system may be implemented as one or more allocated physical components in a cloud environment, such as one or more resources of a datacenter. A meeting substitute system may be associated with multiple physical components that may be located either in one location, or may be distributed across multiple locations.

As used herein, the term "automatically" is used herein and may indicate actions performed by the meeting substitute system 12 with no direct human control and may further encompass requesting and obtaining certain human permissions, such as, for example, permissions to allow the meeting substitute system 12 to record video during the meeting.

The phase "meeting robot" may be used interchangeably with the term "meeting substitute system".

Note that functions described herein as being performed by a meeting substitute system described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring to the drawing figures, in which like elements are referred to by like reference numerals, there is shown in FIG. 1 a schematic diagram of the communication system 10, according to one embodiment, constructed in accordance with the principles of the present disclosure. The communication system 10 in FIG. 1 is a non-limiting example and other embodiments of the present disclosure may be implemented by one or more other systems and/or networks. FIG. 1 presents an overview of the different components in one embodiment of the present disclosure. The communication system 10 includes a meeting substitute system 12 and one or more user devices 14a-14n (collectively referred to as user devices 14), connected over a network 16. The network 16 may include the Internet, one or more cellular networks, and/or any other type of communication network.

The meeting substitute system 12 may include a meeting robot (MR) unit 18 configured to cause the system 12 to obtain information related to a meeting request, the information associated with a teleconference meeting and the information including a date and a time for the teleconference meeting; as a result of a trigger, automatically: join the teleconference meeting at the date and the time; and during the joined teleconference meeting, capturing a set of meeting data for the teleconference meeting, the captured set of meeting data comprising at least one of a video recording and an audio recording of the teleconference meeting and a speech-to-text translation; and generate a meeting summary based at least in part on the captured set of meeting data for the teleconference meeting.

It should be understood that the system 10 may include numerous devices of those shown in FIG. 1, as well as additional devices not shown in FIG. 1. In addition, the system 10 may include many more connections/interfaces than those shown in FIG. 1.

Example implementations, in accordance with some embodiments, meeting substitute system 12 and user device 14 will now be described with reference to FIG. 2.

The meeting substitute system 12 includes a communication interface 20, processing circuitry 22, and memory 24. The communication interface 20 may be configured to communicate with any of the elements of the system 10 according to some embodiments of the present disclosure. In some embodiments, the communication interface 20 may be formed as or may include, for example, one or more radio frequency (RF) transmitters, one or more RF receivers, and/or one or more RF transceivers, and/or may be considered a radio interface. In some embodiments, the communication interface 20 may also include a wired interface.

The processing circuitry 22 may include one or more processors 26 and memory, such as, the memory 24. In particular, in addition to a traditional processor and memory, the processing circuitry 22 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 26 may be configured to access (e.g., write to and/or read from) the memory 24, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the meeting substitute system 12 may further include software stored internally in, for example, memory 24, or stored in external memory (e.g., external database) accessible by the meeting substitute system 12 via an external connection. The software may be executable by the processing circuitry 22. The processing circuitry 22 may be configured to control any of the methods and/or processes described herein and/or to cause such methods, and/or processes to be performed, e.g., meeting substitute system 12 and/or MR unit 18. The memory 24 is configured to store data, programmatic software code and/or other information described herein. In some embodiments, the software may include instructions stored in memory 24 that, when executed by the processor 26 and/or MR unit 18 causes the processing circuitry 22 and/or configures the meeting substitute system 12 to perform the processes described herein with respect to the meeting substitute system 12 (e.g., processes described with reference to FIG. 3 and/or any of the other figures).

The user device 14 includes a communication interface 28, processing circuitry 30, and memory 32. The communication interface 28 may be configured to communicate with any of the elements of the system 10 according to some embodiments of the present disclosure. In some embodiments, the communication interface 28 may be formed as or may include, for example, one or more radio frequency (RF) transmitters, one or more RF receivers, and/or one or more RF transceivers, and/or may be considered a radio interface. In some embodiments, the communication interface 28 may also include a wired interface.

The processing circuitry 30 may include one or more processors 34 and memory, such as, the memory 32. In particular, in addition to a traditional processor and memory, the processing circuitry 30 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 34 may be configured to access (e.g., write to and/or read from) the memory 32, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the user device 14 may further include software stored internally in, for example, memory 32, or stored in external memory (e.g., database) accessible by the user device 14 via an external connection. The software may be executable by the processing circuitry 30. The processing circuitry 30 may be configured to control any of the methods and/or processes described herein and/or to cause such methods, and/or processes to be performed, e.g., by the user device 14. The memory 32 is configured to store data, programmatic software code and/or other information described herein. In some embodiments, the software may include instructions stored in memory 32 that, when executed by the processor 34, causes the processing circuitry 30 and/or configures the user device 14 to perform the processes described herein with respect to the user device 14 (e.g., processes described with reference to a user requesting and/or receiving information related to meeting substitution according to the techniques described in the present disclosure).

Figure 2:
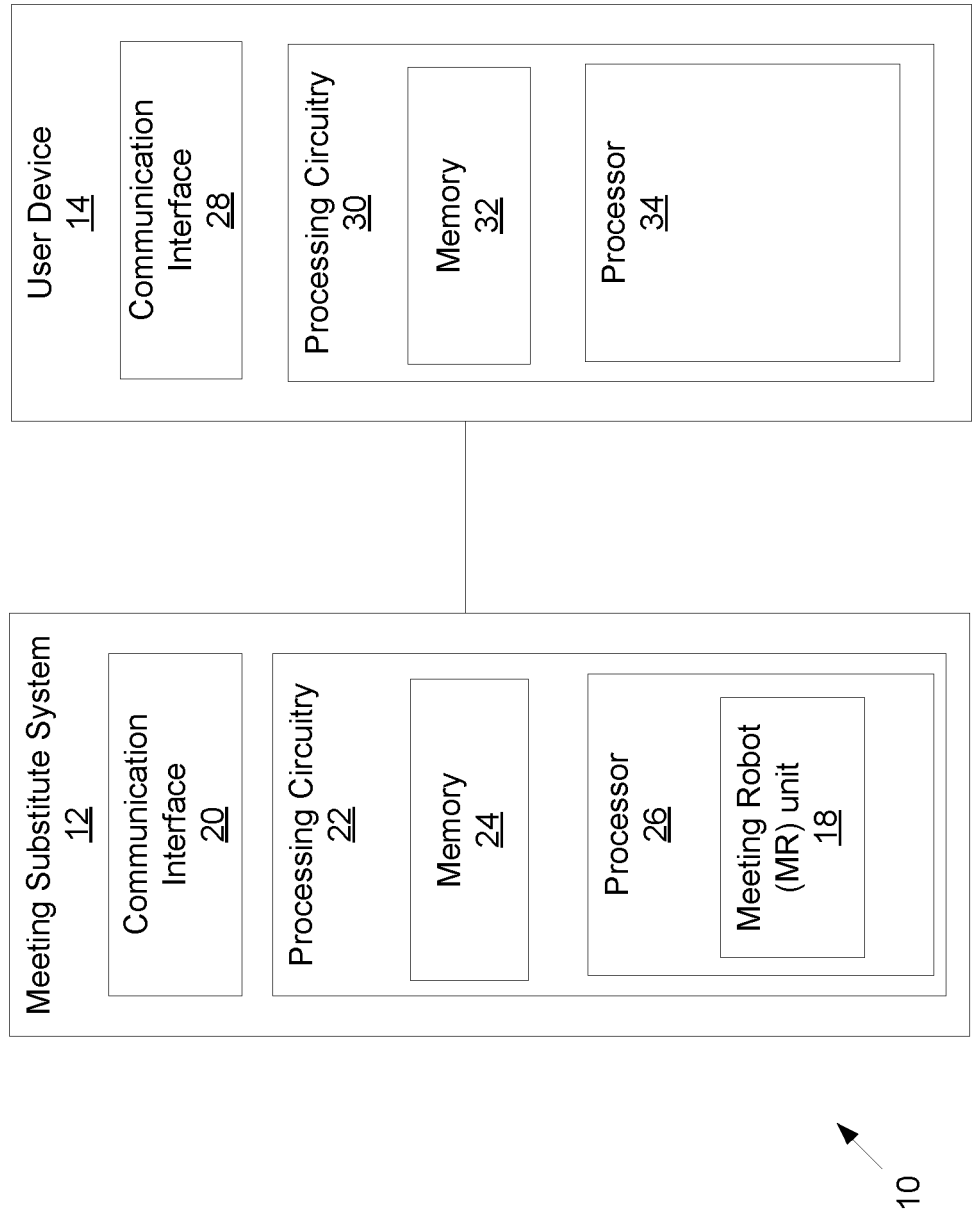
FIG. 2 illustrates yet another example system architecture and example hardware arrangements for devices in the system, according to some embodiments of the present disclosure.

In FIG. 2, the connection between the devices meeting substitute system 12 and user device 14 is shown without explicit reference to any intermediary devices or connections. However, it should be understood that intermediary devices and/or connections may exist between these devices, although not explicitly shown.

Although FIGS. 1 and 2 show various "units" such as MR unit 18 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
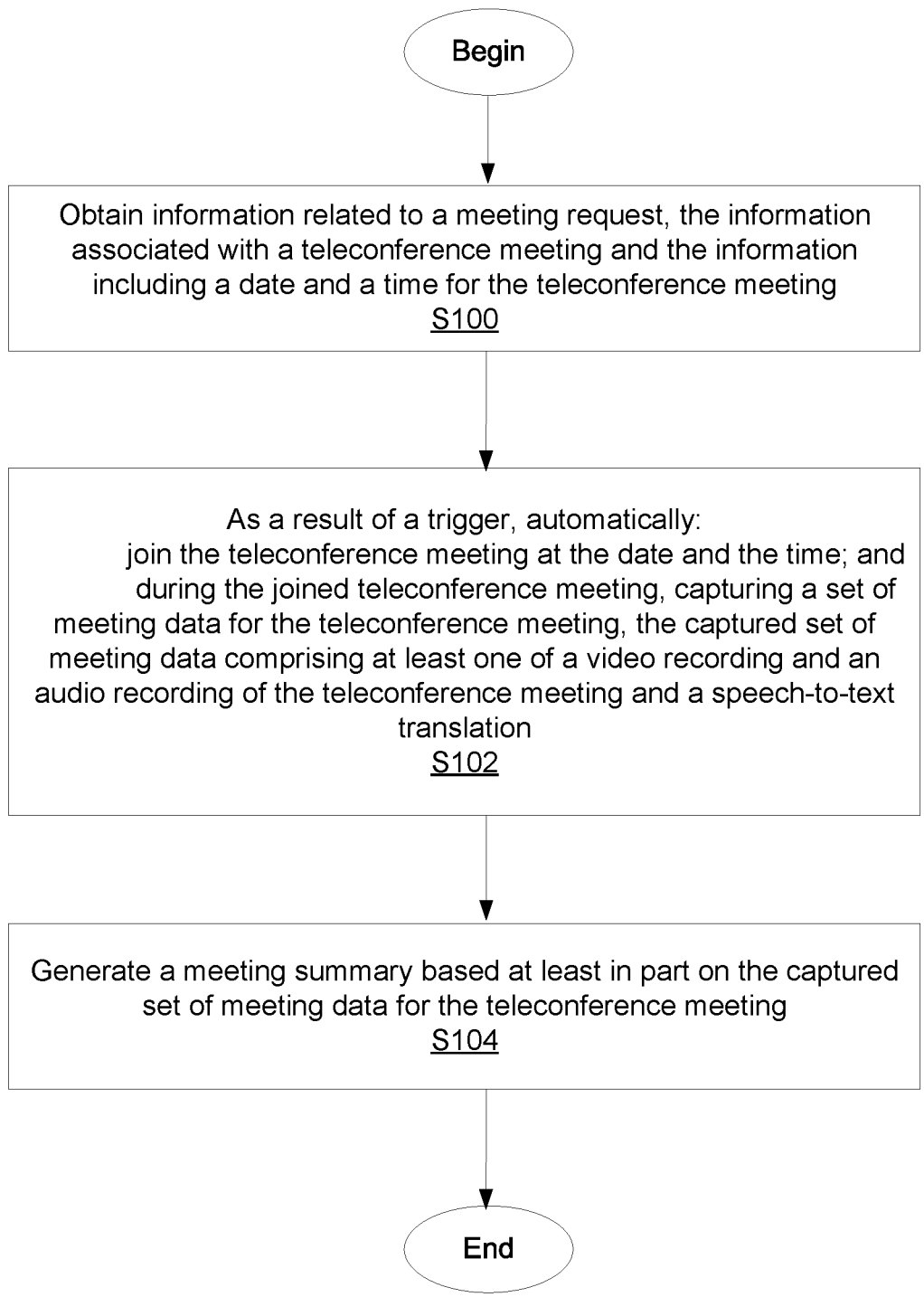
FIG. 3 is a flowchart of an example process in meeting substitute system according to some embodiments of the present disclosure.

FIG. 3 is a flowchart of an example process in a meeting substitute system 12 according to some embodiments of the present disclosure. One or more Blocks and/or functions and/or methods performed by the meeting substitute system 12 may be performed by one or more elements of meeting substitute system 12 such as by MR unit 18 in processing circuitry 22, memory 24, processor 26, communication interface 20, etc. according to the example process/method. The example method includes obtaining (Block S100), such as via MR unit 18, processing circuitry 22, memory 24, processor 26 and/or communication interface 20, information related to a meeting request, the information associated with a teleconference meeting and the information including a date and a time for the teleconference meeting. The method includes as a result of a trigger, automatically: joining (Block S102), such as via MR unit 18, processing circuitry 22, memory 24, processor 26 and/or communication interface 20, the teleconference meeting at the date and the time; and during the joined teleconference meeting, capturing, by the meeting substitute system, a set of meeting data for the teleconference meeting, the captured set of meeting data comprising at least one of a video recording and an audio recording of the teleconference meeting and a speech-to-text translation. The method includes generating (Block S104), such as via MR unit 18, processing circuitry 22, memory 24, processor 26 and/or communication interface 20, a meeting summary based at least in part on the captured set of meeting data for the teleconference meeting.

In some embodiments, obtaining information related to the meeting request includes receiving, such as via MR unit 18, processing circuitry 22, memory 24, processor 26 and/or communication interface 20, the meeting request from a first user device 14 associated with a first user, the first user being an intended recipient of the meeting request. In some embodiments, the trigger includes the receiving of the meeting request from the first user device 14. In some embodiments, the trigger includes obtaining, such as via MR unit 18, processing circuitry 22, memory 24, processor 26 and/or communication interface 20, an indication that at least one user invited to the teleconference meeting is unable to attend the teleconference meeting.

In some embodiments, the trigger is initiated by a first user device 14 associated with a first user account; and the automatically joining by the meeting substitute system 12 includes joining, such as via MR unit 18, processing circuitry 22, memory 24, processor 26 and/or communication interface 20, the teleconference meeting using a second virtual user account associated with the meeting substitute system 12. In some embodiments, the automatically joining and capturing includes automatically joining, such as via MR unit 18, processing circuitry 22, memory 24, processor 26 and/or communication interface 20, the teleconference meeting at the date and the time and capturing the set of meeting data for the teleconference meeting independent of a first user device 14 associated with a first user, the first user being an intended recipient of the meeting request and the first user providing the trigger.

In some embodiments, the automatically joining and capturing includes automatically joining, such as via MR unit 18, processing circuitry 22, memory 24, processor 26 and/or communication interface 20, the teleconference meeting at the date and the time and capturing the set of meeting data for the teleconference meeting independent of any user device 14 associated with any user that is an intended recipient of the meeting request. In some embodiments, generating the meeting summary includes providing, such as via MR unit 18, processing circuitry 22, memory 24, processor 26 and/or communication interface 20, the speech-to-text translation of the teleconference meeting to at least one natural language processing model to generate a text-based meeting summary.

In some embodiments, generating the meeting summary includes determining, such as via MR unit 18, processing circuitry 22, memory 24, processor 26 and/or communication interface 20, a domain associated with the teleconference meeting and selecting, such as via MR unit 18, processing circuitry 22, memory 24, processor 26 and/or communication interface 20, the at least one natural language processing model to use for the meeting summary based at least in part on the domain. In some embodiments, the at least one natural language processing model is configured to, such as via MR unit 18, processing circuitry 22, memory 24, processor 26 and/or communication interface 20, use the speech-to-text translation and the determined domain to output at least one of: at least one key discussion point of the teleconference meeting; at least one action item for the teleconference meeting; and at least one answer to at least one question asked during the teleconference meeting.

In some embodiments, generating the meeting summary further includes autonomously selecting, such as via MR unit 18, processing circuitry 22, memory 24, processor 26 and/or communication interface 20, a plurality of video segments from the video recording and generating a video meeting summary comprising the selected plurality of video segments. In some embodiments, selecting the plurality of video segments includes using the speech-to-text translation, such as via MR unit 18, processing circuitry 22, memory 24, processor 26 and/or communication interface 20, to identify at least one of: at least one key discussion point of the teleconference meeting; at least one action item for the teleconference meeting; and at least one answer to at least one question asked during the teleconference meeting; and selecting, such as via MR unit 18, processing circuitry 22, memory 24, processor 26 and/or communication interface 20, the plurality of video segments from the video recording corresponding to the at least one of the at least one key discussion point, the at least one action item and the at least one answer.

In some embodiments, the meeting summary includes at least one of: meeting minutes document based at least in part on the speech-to-text translation; and a video meeting summary based at least in part on the speech-to-text translation. In some embodiments, the method further includes accepting, such as via MR unit 18, processing circuitry 22, memory 24, processor 26 and/or communication interface 20, the meeting request using a virtual user account associated with the meeting substitute system, the virtual user account being different from a first user account associated with a first user device 14 that received the meeting request for the teleconference meeting. In some embodiments, the method further includes monitoring, such as via MR unit 18, processing circuitry 22, memory 24, processor 26 and/or communication interface 20, an electronic calendar comprising a plurality of meeting events scheduled using a virtual user account associated with the meeting substitute system 12. In some embodiments, the automatically joining the teleconference meeting, such as via MR unit 18, processing circuitry 22, memory 24, processor 26 and/or communication interface 20, is based at least in part on the electronic calendar.

In some embodiments, the method further includes storing, such as via MR unit 18, processing circuitry 22, memory 24, processor 26 and/or communication interface 20, in a relational database associated with the meeting substitute system 12, the plurality of meeting events, including the information related to the meeting request; determining, such as via MR unit 18, processing circuitry 22, memory 24, processor 26 and/or communication interface 20, whether there are duplicate entries in the relational database for a same teleconference meeting; and based on the determination, joining, such as via MR unit 18, processing circuitry 22, memory 24, processor 26 and/or communication interface 20, the same teleconference meeting once and providing a same set of meeting data to each user device associated with the duplicate entries.

In some embodiments, the method further includes determining, such as via MR unit 18, processing circuitry 22, memory 24, processor 26 and/or communication interface 20, that the teleconference meeting is over; and based on the determination, automatically stopping, such as via MR unit 18, processing circuitry 22, memory 24, processor 26 and/or communication interface 20, the capturing of the set of meeting data for the teleconference meeting and initiating the generation of the meeting summary. In some embodiments, the method further includes when the teleconference meeting is over, providing, to a first user device 14 associated with a first user, access to at least a subset of the set of meeting data for the teleconference meeting and the generated meeting summary, the first user being an intended recipient of the meeting request. In some embodiments, the providing includes sending, such as via MR unit 18, processing circuitry 22, memory 24, processor 26 and/or communication interface 20, a meeting notification to the first user device 14 associated with the intended recipient of the meeting request, the meeting notification being associated with the meeting request and the meeting notification providing access information.

Having generally described arrangements for a meeting robot system and method, a more detailed description of some of the embodiments are provided as follows with reference to FIGS. 4 and 5, and which may be implemented by may be implemented by any one or more of meeting substitute system 12 and user device 14.

Some embodiments of the present disclosure may include one or more of the following steps, which may be performed by any one or more of meeting substitute system 12 and user device 14.

Although the term "user" may be used to describe examples of some embodiments, it should be understood that the user device 14 may be performing the various steps.

Generally, some embodiments of the proposed arrangement may include: 1) the user device 14 associated with a user forwarding a meeting request to the meeting substitute system 12; 2) the meeting substitute system 12 receiving the meeting request, which triggers the meeting substitute system 12 to perform the meeting substitution process; and 3) after the meeting, the meeting substitute system 12 sends a notification/message to the user device 14, which message may permit access to a recording of the meeting and/or a summary of the meeting (e.g., text-based, audio-based and/or video-based meeting summary)

Figure 4:
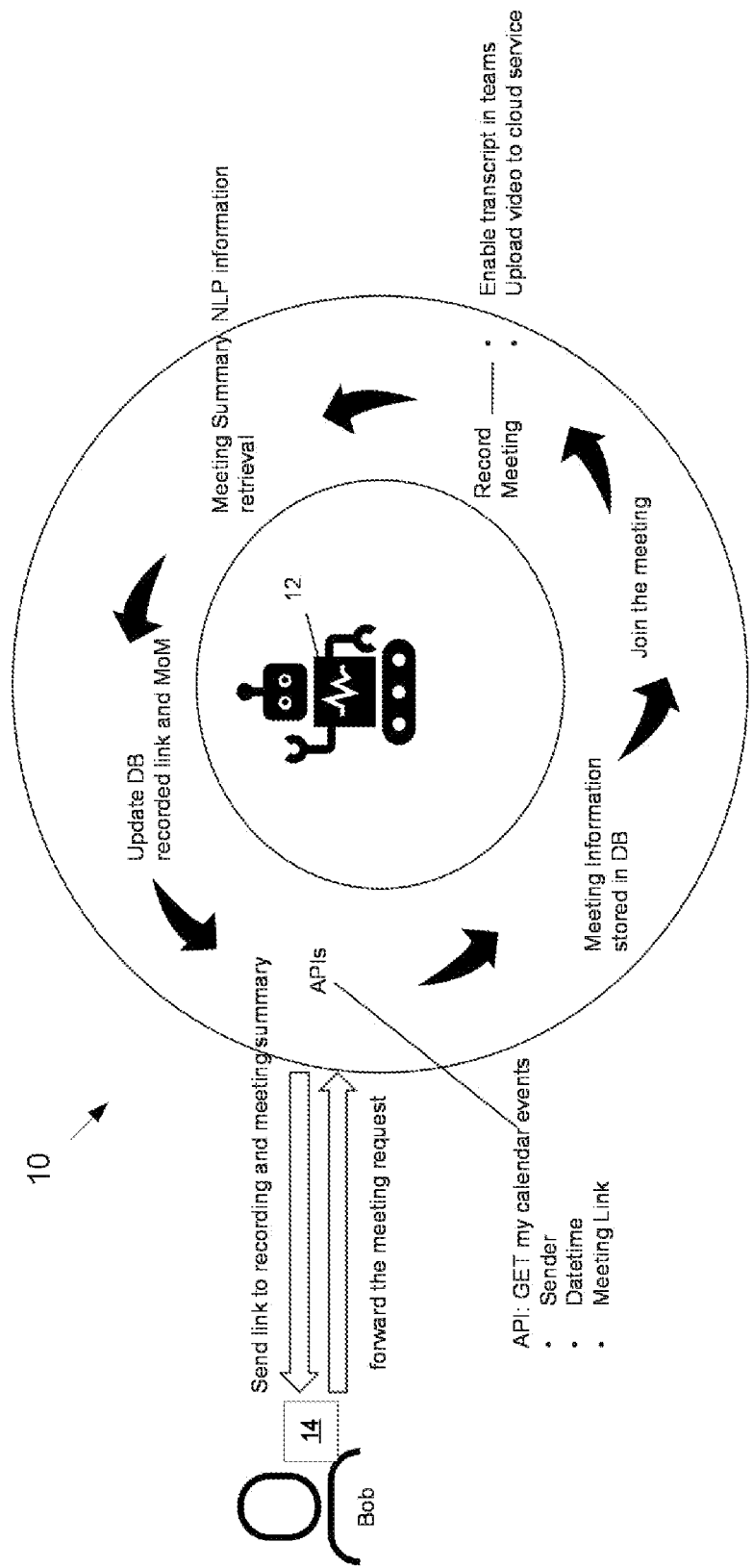
FIG. 4 is a schematic diagram for a meeting conducted according to some embodiments of the present disclosure.

A more detailed description of the proposed arrangement follows using an example meeting, as shown in FIG. 4. The user device 14 associated with a user (e.g., Bob) may receive a meeting request (e.g., emailed meeting invite) to attend a teleconference meeting from another person, such as a co-worker. Both the user and his co-worker may have separate user accounts for the calendar, email and/or teleconference meeting platform(s). The meeting request may include information about the requested meeting, such as a date and a time for the meeting. The user may determine that he cannot attend the meeting due to e.g., a conflict with another meeting. The user device 14 may then trigger the meeting substitute system 12 by, for example, forwarding the meeting request to the meeting substitute system 12.

In an alternative embodiment, the meeting substitute system 12 may be triggered in other ways, such as, by being provided with another indication that at least one meeting invitee is unable to attend the meeting associated with the meeting request. For example, the meeting substitute system 12 may determine that at least two meetings overlapping in time/date are on at least one meeting invitee's electronic calendar platform, e.g., Outlook Calendar.

The meeting substitute system 12 may thus be triggered, such as, by receiving the meeting request from the user device 14. As a result of the trigger, the meeting substitute system 12 may determine to join the meeting according to the meeting information. For example, the meeting substitute system 12 may determine to automatically join the meeting at the date and time in the meeting request and/or use a link and/or passcode information to access and join the teleconference meeting, which link and/or passcode may be included in the meeting request.

In some embodiments, the meeting substitute system 12 may have its own user accounts for the calendar, email and/or teleconference meeting platform(s), which are referred to herein as a "virtual user account". The meeting substitute system 12 may have its own email address. The meeting substitute system 12 may accept the forwarded meeting request using e.g., the meeting substitute system's 12 virtual user email account, which may then cause the electronic calendar associated with the meeting substitute system's 12 virtual user account to be populated with the meeting event. The meeting event on the electronic calendar may include the meeting information (e.g., date, time, link, passcodes, etc.).

In some embodiments, the meeting substitute system 12 may monitor the electronic calendar, which may include a plurality of different meeting events scheduled using the virtual user account.

In some embodiments, the meeting substitute system 12 may periodically read its electronic calendar, such as, for example, via an application programming interface (API) (e.g., GET my calendar events). The meeting substitute system 12 may store meeting events, retrieved via the API, in a database, such as a relational database, e.g., a MySQL database. In some embodiments, the meeting substitute system 12 may determine whether there are duplicate entries in the database for the same teleconference meeting, e.g., such as where there are two invitees that cannot attend. If there is a duplicate entry for the same teleconference meeting, the meeting substitute system 12 may determine to only join that teleconference meeting once and to provide the same set of meeting data (e.g., recording, summary of meeting, etc.) to each user device 14 associated with the duplicate entries.

On the date the teleconference meeting is scheduled on the calendar, and at (or slightly before) the time the meeting is scheduled for, the meeting substitute system 12 may join the teleconference meeting using, for example, the meeting information included in the meeting request and/or the calendared meeting event. For example, the meeting substitute system 12 may use the meeting link to join the meeting. The meeting substitute system 12 may also use its own virtual user account username and password to login to the teleconference meeting platform. The meeting substitute system 12 may use APIs associated with the calendar, email and/or teleconference meeting platforms to interact with these platforms (instead of human user clicks and other human user-inputs).

In some embodiments, it may be considered that the meeting substitute system 12 accesses and joins the teleconference meeting independent of any human user and independent of any user device 14 associated with a human user. In some embodiments, it may be considered that the meeting substitute system 12 accesses, joins and/or captures meeting data for the teleconference meeting independent of any user device 14 associated with any human user that is an intended recipient of the meeting request.

During the joined teleconference meeting, the meeting substitute system 12 may capture a set of meeting data. In some embodiments, recording audio and/or video of the meeting may be enabled when the meeting substitute system 12 is present. In some embodiments, a transcript function may be enabled during the meeting to translate the meeting's audio into text via speech-to-text translation when the meeting substitute system 12 is present. The captured set of meeting data may include a video recording, audio recording and/or a speech-to-text translation of the audio recording.

In some embodiments, one or more of the captured set of meeting data may be automatically uploaded to a database, cloud or other service such that users may be able to view, organize and/or share the meeting data from a central location.

In some embodiments, the meeting substitute system 12 may generate a meeting summary based at least in part on the captured set of data. In some embodiments, the speech-to-text translation may be used to generate a text-based meeting summary. For example, in one embodiment, the speech-to-text translation may be input into a natural language processing (NLP) model to generate and/or output a text-based meeting summary. The NLP model may include deep learning knowledge. Several algorithms may be used for the NLP model, such as, for example, recurrent neural network (RRN), deep structured semantic model (DSSM), long short-term memory, etc.

In some embodiments, generating the meeting summary (e.g., meeting minutes) may include, for example, identifying high frequency words as an indication of a key discussion point during the meeting and including such topics in the meeting summary, removing pronouns or other ancillary words, identifying answers to questions asked during the meeting, analyzing the speech-to-text translation to determine action points in the meeting, etc. In some embodiments, one or more NLP models may be trained to output at least one of: at least one key discussion point of the teleconference meeting; at least one action item for the teleconference meeting; and at least one answer to at least one question asked during the teleconference meeting. The meeting summary may be shorter than the speech-to-text translation (e.g., the speech-to-text translation may correspond to the full meeting audio, while the meeting summary may be considered to represent a brief statement of the main meeting points).

In some embodiments, the meeting substitute system 12 may include and/or use a separate NLP model per domain. A "domain" may be considered an area of activity or knowledge, such as telecom, finance, etc. Since different terminology, acronyms, meanings, etc. may be used in different domains, each NLP model may be trained per domain or even per company. The meeting substitute system 12 may determine the domain associated with the scheduled teleconference meeting and then may select the particular NLP model out of a plurality of NLP models to use to generate the meeting summary.

In some embodiments, the meeting substitute system 12 may generate a meeting summary by selecting a plurality of video segments from the video recording and generating a video meeting summary comprising the selected plurality of video segments. In some embodiments, the meeting substitute system 12 may select the video segments using the speech-to-text translation and/or the one or more NLPs to identify one or more of at least one key discussion point of the teleconference meeting; at least one action item for the teleconference meeting; and at least one answer to at least one question asked during the teleconference meeting. The meeting substitute system 12 may then select the video segments from the video recording corresponding to (e.g., aligning in time with, matching audio and text, etc.) one or more of the key discussion points, action items and answers.

The meeting summary may be generated and/or provided to the user device 14 as, for example, a meeting minutes document (e.g., Word document) and/or a video-based summary (i.e., video segments). The meeting substitute system 12 may retrieve a link to the audio and/or video recording and the meeting minutes document and may save it to a database, cloud, etc. e.g., the MySQL database. In some embodiments, the database may be stored in a memory at the meeting substitute system 12.

When the teleconference meeting is over, the meeting substitute system 12 may send a meeting notification to the user device 14 (e.g., that forwarded the meeting request, the intended recipient of the meeting request, etc.). The meeting notification may include information that provides access to one or more of the captured set of meeting data (e.g., audio/video recording, speech-to-text translation, etc.) and/or the generated meeting summary.

In some embodiments, the meeting substitute system 12 may determine when the meeting is over and based on such determination, may automatically stop capturing the set of meeting data (e.g., stop recording and stop the speech-to-text translation) and may then initiate the generation of the meeting summary. The recording is performed in real-time during the meeting, but the meeting summary may be generated after the meeting. After the meeting summary is generated, the meeting substitute system 12 may send the meeting notification to provide the user with access to the meeting data and/or the meeting summary.

Figure 5:
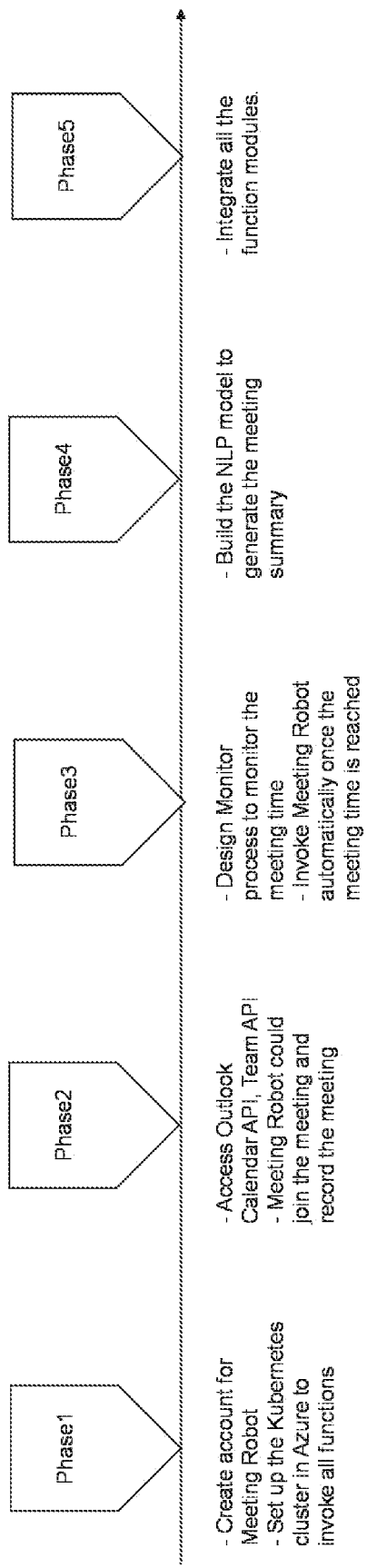
FIG. 5 is a schematic diagram of an example implementation of the meeting robot system and method according to some embodiments of the present disclosure.

FIG. 5 illustrates an example implementation of the meeting substitute system 12. In the example of FIG. 5, in a first phase, an account may be created for the meeting substitute system 12. In some embodiments, a Kubernetes cluster in Azure may be set-up in invoke one or more of the functions described herein. In a second phase, an Outlook Calendar API and Teams API may be accessed and used for the meeting substitute system 12 to join and the record meeting. In a third phase, a monitoring process may be configured to monitor the meeting time. The meeting substitute system 12 may be automatically invoked once the meeting time is reached. In a fourth phase, the meeting substitute system 12 may build the NLP model to generate the meeting summary. In a fifth phase, the function modules may be integrated.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A computer-implemented method, the method comprising:
   obtaining, by a meeting substitute system, information related to a meeting request, the information associated with a teleconference meeting and the information including a date and a time for the teleconference meeting, the meeting request being received by a first user account associated with a first user device;
   determining whether a conflict exists between the teleconference meeting and another teleconference meeting;
   as a result of a trigger, the trigger being based at least in part on the determination of an existence of a conflict, automatically:
      accepting, by the meeting substitute system, the meeting request using a virtual user account associated with the meeting substitute system, the virtual user account being different from the first user account;
      joining, by the meeting substitute system, the teleconference meeting at the date and the time; and
      during the joined teleconference meeting, capturing, by the meeting substitute system, a set of meeting data for the teleconference meeting, the captured set of meeting data comprising at least one of a video recording and an audio recording of the teleconference meeting and a speech-to-text translation; and
   generating, by the meeting substitute system, a meeting summary based at least in part on the captured set of meeting data for the teleconference meeting.

2. The computer-implemented method of claim 1, wherein:
   obtaining information related to the meeting request comprises:
      receiving, by the meeting substitute system, the meeting request from the first user device, the first user device being associated with a first user, the first user being an intended recipient of the meeting request.

3. The computer-implemented method of claim 2, wherein the trigger comprises the receiving of the meeting request from the first user device.

4. The computer-implemented method of claim 1, wherein the trigger comprises obtaining, by the meeting substitute system, an indication that at least one user invited to the teleconference meeting is unable to attend the teleconference meeting.

5. The computer-implemented method of claim 2, wherein the trigger is initiated by the first user device associated with a first user account; and
   the automatically joining by the meeting substitute system comprises joining the teleconference meeting using a second virtual user account associated with the meeting substitute system.

6. The computer-implemented method of claim 2, wherein the automatically joining and capturing comprises:
   automatically joining, by the meeting substitute system, the teleconference meeting at the date and the time and capturing the set of meeting data for the teleconference meeting independent of the first user device associated with the first user, the first user being an intended recipient of the meeting request and the first user providing the trigger.

7. The computer-implemented method of claim 1, wherein the automatically joining and capturing comprises:
   automatically joining, by the meeting substitute system, the teleconference meeting at the date and the time and capturing the set of meeting data for the teleconference meeting independent of any user device associated with any user that is an intended recipient of the meeting request.

8. The computer-implemented method of claim 1, wherein generating the meeting summary comprises:
   providing the speech-to-text translation of the teleconference meeting to at least one natural language processing model to generate a text-based meeting summary.

9. The computer-implemented method of claim 8, wherein generating the meeting summary comprises:
   determining a domain associated with the teleconference meeting and selecting the at least one natural language processing model to use for the meeting summary based at least in part on the domain.

10. The computer-implemented method of claim 9, wherein the at least one natural language processing model is configured to use the speech-to-text translation and the determined domain to output at least one of:
    at least one key discussion point of the teleconference meeting;
    at least one action item for the teleconference meeting; and
    at least one answer to at least one question asked during the teleconference meeting.

11. The computer-implemented method of claim 1, wherein generating the meeting summary further comprises:
    autonomously selecting a plurality of video segments from the video recording and generating a video meeting summary comprising the selected plurality of video segments.

12. The computer-implemented method of claim 11, wherein selecting the plurality of video segments comprises:
    using the speech-to-text translation to identify at least one of:
       at least one key discussion point of the teleconference meeting;
       at least one action item for the teleconference meeting; and
       at least one answer to at least one question asked during the teleconference meeting; and
    selecting the plurality of video segments from the video recording corresponding to the at least one of the at least one key discussion point, the at least one action item and the at least one answer.

13. The computer-implemented method of claim 1, wherein the meeting summary comprises at least one of:
    a meeting minutes document based at least in part on the speech-to-text translation; and
    a video meeting summary based at least in part on the speech-to-text translation.

14. The computer-implemented method of claim 1, further comprising:
    monitoring an electronic calendar comprising a plurality of meeting events scheduled using a virtual user account associated with the meeting substitute system; and
    wherein the automatically joining the teleconference meeting is based at least in part on the electronic calendar.

15. The computer-implemented method of claim 14, further comprising:
storing, in a relational database associated with the meeting substitute system, the plurality of meeting events, including the information related to the meeting request;
determining whether there are duplicate entries in the relational database for a same teleconference meeting; and
based on the determination, joining the same teleconference meeting once and providing a same set of meeting data to each user device associated with the duplicate entries.

16. The computer-implemented method of claim 1, further comprising:
determining, by the meeting substitute system, that the teleconference meeting is over; and
based on the determination, automatically stopping, by the meeting substitute system, the capturing of the set of meeting data for the teleconference meeting and initiating the generation of the meeting summary.

17. The computer-implemented method of claim 2, further comprising:
when the teleconference meeting is over, providing, to the first user device associated with the first user, access to at least a subset of the set of meeting data for the teleconference meeting and the generated meeting summary, the first user being an intended recipient of the meeting request.

18. The computer-implemented method of claim 17, wherein the providing comprises:
sending, by the meeting substitute system, a meeting notification to the first user device associated with the intended recipient of the meeting request, the meeting notification being associated with the meeting request and the meeting notification providing access information.

19. A meeting substitute system comprising processing circuitry, the processing circuitry configured to cause the meeting substitute system to:
obtain information related to a meeting request, the information associated with a teleconference meeting and the information including a date and a time for the teleconference meeting, the meeting request being received by a first user account associated with a first user device;
determine whether a conflict exists between the teleconference meeting and another teleconference meeting;
as a result of a trigger, the trigger being based at least in part on the determination of an existence of a conflict, automatically:
accept, by the meeting substitute system, the meeting request using a virtual user account associated with the meeting substitute system, the virtual user account being different from the first user account;
join the teleconference meeting at the date and the time; and
during the joined teleconference meeting, capturing a set of meeting data for the teleconference meeting, the captured set of meeting data comprising at least one of a video recording and an audio recording of the teleconference meeting and a speech-to-text translation; and
generate a meeting summary based at least in part on the captured set of meeting data for the teleconference meeting.

20. The system of claim 19, wherein the trigger is initiated by a first user device associated with a first user account; and
the processing circuitry is configured to cause the meeting substitute system to automatically join by being configured to join the teleconference meeting using a second virtual user account associated with the meeting substitute system.

21. The system of claim 19, wherein the processing circuitry is configured to cause the meeting substitute system to generate the meeting summary by being configured to cause the meeting substitute system to:
autonomously select a plurality of video segments from the video recording and generating a video meeting summary comprising the selected plurality of video segments, by:
using speech-to-text translation to identify at least one of:
at least one key discussion point of the teleconference meeting;
at least one action item for the teleconference meeting; and
at least one answer to at least one question asked during the teleconference meeting; and
selecting the plurality of video segments from the video recording corresponding to the at least one of the at least one key discussion point, the at least one action item and the at least one answer.

* * * * *

UNITED STATES PATENT AND TRADEMARK OFFICE
CERTIFICATE OF CORRECTION

| | | |
|---|---|---|
| PATENT NO. | : 12,199,785 B2 | Page 1 of 1 |
| APPLICATION NO. | : 18/246915 | |
| DATED | : January 14, 2025 | |
| INVENTOR(S) | : Wang et al. | |

It is certified that error appears in the above-identified patent and that said Letters Patent is hereby corrected as shown below:

In the Specification

In Column 7, Line 34, delete "phase" and insert -- phrase --, therefor.

In Column 8, Line 37, delete "Circuitry)" and insert -- Circuits) --, therefor.

In Column 9, Line 15, delete "Circuitry)" and insert -- Circuits) --, therefor.

In Column 12, Line 45, delete "summary)" and insert -- summary). --, therefor.

In Column 14, Line 26, delete "(RRN)," and insert -- (RNN), --, therefor.

Signed and Sealed this
Twelfth Day of August, 2025

Coke Morgan Stewart
*Acting Director of the United States Patent and Trademark Office*